US009936007B1

(12) United States Patent
Cropper et al.

(10) Patent No.: US 9,936,007 B1
(45) Date of Patent: *Apr. 3, 2018

(54) SWAPPING NON-VIRTUALIZING AND SELF-VIRTUALIZING DEVICES

(71) Applicant: International Business Machines Corporation, Armonk, NY (US)

(72) Inventors: Joseph W. Cropper, Austin, TX (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,602

(22) Filed: Sep. 15, 2017

Related U.S. Application Data

(63) Continuation of application No. 15/404,347, filed on Jan. 12, 2017.

(51) Int. Cl.
| | | |
|---|---|---|
| *G06F 15/16* | (2006.01) | |
| *H04L 29/08* | (2006.01) | |
| *H04L 12/24* | (2006.01) | |
| *G06F 9/50* | (2006.01) | |

(52) U.S. Cl.
CPC ........ *H04L 67/1012* (2013.01); *G06F 9/5077* (2013.01); *H04L 41/0816* (2013.01); *H04L 41/5025* (2013.01)

(58) Field of Classification Search
None
See application file for complete search history.

(56) References Cited

U.S. PATENT DOCUMENTS

| | | |
|---|---|---|
| 8,208,396 B2 | 6/2012 | Eisenhauer et al. |
| 8,271,707 B2 | 9/2012 | Fan et al. |
| 8,537,706 B2 | 9/2013 | Cardona et al. |
| 9,172,640 B2 | 10/2015 | Vincent et al. |
| 9,201,681 B2 | 12/2015 | Bert et al. |

(Continued)

OTHER PUBLICATIONS

Mell, et al., "The NIST Definition of Cloud Computing", Recommendations of the National Institute of Standards and Technology, Special Publication 800-145, Sep. 2011, 7 pages.

(Continued)

*Primary Examiner* — Lance L Barry
(74) *Attorney, Agent, or Firm* — Daniel C. Housley

(57) ABSTRACT

A virtualization instance (VI) uses a first virtual device that is a virtual form of non-virtualizing devices or a second virtual device that is a virtual form of self-virtualizing device to meet Quality of Service (QoS) objectives. A method for managing resources comprises receiving first QoS metrics, determining QoS objectives are unmet, determining that a first substitute virtual device comprising a virtual form of self-virtualizing device is available and can meet QoS objectives, configuring the VI to use the first substitute virtual device in place of the first virtual device, receiving second QoS metrics, determining QoS objectives are exceeded, determining that a second substitute virtual device comprising a virtual form of the non-virtualizing device is available and can meet QoS objectives, and configuring the VI to use the second substitute virtual device in place of the second virtual device. A computer programming product and a system can embody the method.

1 Claim, 7 Drawing Sheets

(56) References Cited

U.S. PATENT DOCUMENTS

| | | | |
|---|---|---|---|
| 9,378,037 B2 | 6/2016 | Krishna | |
| 2011/0202702 A1 | 8/2011 | Fan et al. | |
| 2011/0274108 A1* | 11/2011 | Fan | H04L 12/4633 370/390 |
| 2012/0124572 A1* | 5/2012 | Cunningham | G06F 9/45558 718/1 |
| 2012/0159245 A1* | 6/2012 | Brownlow | G06F 11/0712 714/23 |
| 2013/0159572 A1 | 6/2013 | Graham et al. | |
| 2013/0159686 A1* | 6/2013 | Graham | G06F 9/5077 713/1 |
| 2015/0156124 A1 | 6/2015 | Tsuji | |
| 2015/0271244 A1 | 9/2015 | Bloch et al. | |
| 2016/0188510 A1 | 6/2016 | Singh et al. | |
| 2016/0203027 A1* | 7/2016 | Challa | G06F 9/5038 718/1 |
| 2016/0246635 A1 | 8/2016 | Kaplan et al. | |
| 2017/0242720 A1* | 8/2017 | Anand | G06F 9/45558 |

OTHER PUBLICATIONS

Richter, et al., "A Hardware/Software Approach for Mitigating Performance Interference Effects in Virtualized Environments Using SR-IOV", 2015 IEEE 8th International Conference of Cloud Computing, 8 pages.

Suzuki, et al., "Multi-Root Share of Single-Root I/O Virtualization (SR-IOV) Compliant PCI Express Device", 2010 18th IEEE Symposium on High Performance Interconnects, Aug. 18-20, 2010, 7 pages.

Unknown, "Network Aware Decisions", VMTurbo, Arista Nework Control Module. 2 pages.

Unknown, "Configuring SR-IOV with HP Virtual Connect and Microsoft Hyper-V", HP Technical White Paper, Version 830456-001, Edition: 1, Jun. 2015. 26 pages.

Unknown, "Nagios Is the Industry Standard in IT Infrastructure", Nagios, https://www.nagios.org/. Last accessed Nov. 20, 2016. 7 pages.

Unknown, "Single Route I/O Virtualization-Dynamic Network Optimizer", An IP.com Prior Art Database Technical Disclosure, IP.com No. IPCOM000231850D. IP.com Electronic Publication Date: Oct. 9, 2013. 6 pages.

Unknown, "DRS Performance and Best Practices", VMware, Performance Study, 2008. 19 pages.

List of IBM Patents or Patent Applications Treated as Related, dated Sep. 15, 2017, pp. 1-2.

Cropper et al., "Swapping Non-Virtualizing and Self-Virtualizing Devices", U.S. Appl. No. 15/404,347, filed Jan. 12, 2017.

* cited by examiner

SWAPPING NON-VIRTUALIZING AND SELF-VIRTUALIZING DEVICES

CROSS-REFERENCE TO RELATED APPLICATIONS

This application is a continuation of U.S. patent application Ser. No. 15/404,347, filed on Jan. 12, 2017 by Joseph W. Cropper, et al., and entitled SWAPPING NON-VIRTUALIZING AND SELF-VIRTUALIZING DEVICES, the entire disclosure of which is incorporated by reference herein.

BACKGROUND

The present disclosure relates to managing computing resources in a cloud computing environment and, more particularly, to managing resources associated with virtualized computing devices.

SUMMARY

According to embodiments of the present disclosure, a processor can perform a computer-implement method to manage cloud computing resources. In performing the method, the processor receives Quality of Service (QoS) metrics associated with a virtualization instance (VI) of a cloud computing environment. The processor receives the metrics via an interface communicatively coupled to the processor. The VI provides cloud computing services to a consumer device accessing cloud computing services, and the VI is associated with VI QoS objectives. The VI QoS objectives correspond to the VI providing the cloud computing services to the consumer device.

The VI is configured to use a virtual device to meet the QoS objectives. In response to receiving the QoS metrics, and based on a comparison of the QoS metrics with the VI QoS objectives, the processor determines that the VI is unable to meet the VI QoS objectives using the virtual device. Based on the VI unable to meet the VI QoS objectives using the virtual device, the processor determines that the virtual device is a virtual form of a non-virtualizing computing device, that a substitute virtual device, comprising a virtual form of a self-virtualizing computing device, is available to substitute for the virtual device, and that VI is able to meet the VI QoS objectives using the substitute virtual device. Based on the VI able to meet the VI QoS objectives using the substitute virtual device, the processor configures the VI to use the substitute virtual device in place of the virtual device.

In some embodiments, the VI is configured to use a second virtual device to meet the VI QoS objectives, and the method can further include the processor performing a second comparison of second QoS metrics with the VI QoS objectives. In response to receiving the second QoS metrics, and based on a comparison of the second QoS metrics with the VI QoS objectives, the processor determines that the VI is able to surpass the VI QoS objectives using the second virtual device. Based on the VI able to surpass the VI QoS objectives using the second virtual device, the processor determines that the second virtual device is a virtual form of a non-virtualizing computing device, that a second substitute virtual device, comprising a virtual form of a self-virtualizing computing device, is available to substitute for the second virtual device, and that VI is able to meet the VI QoS objectives using the second substitute virtual device. Based on the VI able to meet the VI QoS objectives using the second substitute virtual device, the processor configures the VI to use the second substitute virtual device in place of the second virtual device.

In embodiments, the QoS metrics can include performance indicators associated with at least one of the VI, the second virtual device, and a component among the components underlying the first virtual device, and the processor can determine that the VI is able to surpass the VI QoS objectives using the first or second virtual device based on the performance indicators. In some embodiments, each of the non-virtualizing computing device and the self-virtualizing computing device can comprise a network device.

A computer-programming product can embody features of the method. A system, comprising a computer in a cloud computing environment and a QoS manager in communication with the computer, can embody aspects of the method. The computer comprises a VI, a first computing device comprising a non-virtualizing type device and a second computing device comprising a self-virtualizing type device. The QoS manager comprises one or more processors to perform features of the method and cause the computer to configure the VI to use a substitute virtual device in place of a virtual device configured in the VI to meet the QoS objective, according to aspects of the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
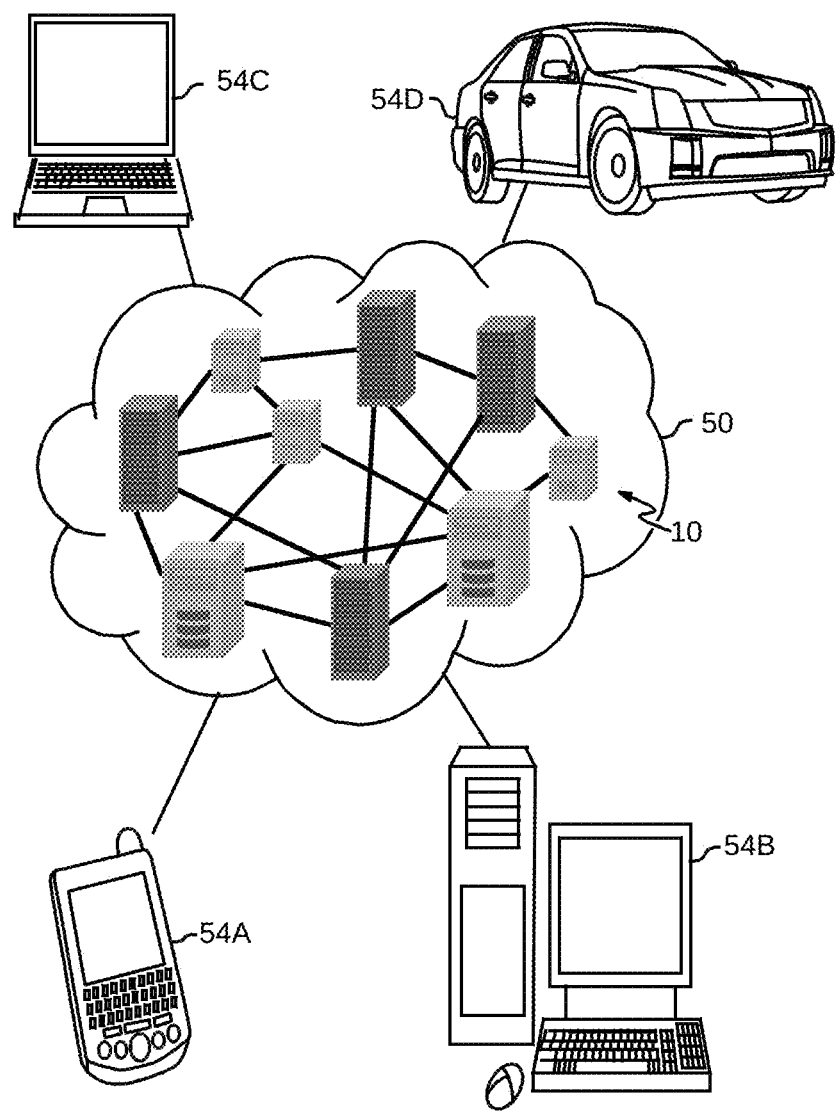
FIG. 1 depicts a cloud computing environment, according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "the disclosure") relate to allocation of virtual device resources to virtualization instances (e.g., virtual machines) in a cloud computing environment. More particular aspects relate to dynamically interchanging virtual device resources using underlying physical computing devices that do not have self-virtualization capabilities and virtual device resources using underlying physical computing devices that have self-virtualization capabilities, and vice-versa.

While the disclosure is not necessarily limited to such applications, various aspects of the disclosure may be appreciated through a discussion of various examples using this context. It is to be further understood that although this disclosure includes a detailed description of aspects and elements of cloud computing, implementation of the teachings recited herein are not limited to a cloud computing environment or components and/or functions thereof.

Cloud computing is a model of computing service delivery to "cloud consumers" that can enable a cloud consumer to have convenient, on-demand network access to a shared pool of configurable computing resources within a cloud computing environment (e.g., computing devices and/or virtual instances thereof, networks, network bandwidth, servers, processing, memory, storage, applications, virtual machines, and computing services). It is further an aspect of cloud computing environments that cloud computing resources can be rapidly provisioned and released with minimal management effort or interaction between a cloud consumer and a provider of cloud computing services (hereinafter, "provider"). As used herein, "cloud" refers to any cloud computing environment such as, but not necessarily limited to, embodiments described herein.

A cloud consumer can be, for example, a computing device or computing application, and/or a computing or other electronic device used by a human user (or, users) capable of accessing cloud computing services (hereinafter, "cloud services") via an on-demand computing network. A cloud consumer can be a human user, or a human organization or enterprise, and human users can use a consumer device to provision, access, and/or receive cloud computing services. As used herein, "consumer device" refers to any computing or electronic device (or, computing application executing therein) connected to, or capable of connecting to, a cloud computing environment to provision, access, and/or receive cloud services provided by a cloud computing environment, whether operating autonomously or at the direction of a human user. Further, "consumer", as used herein, refers interchangeably to a user of a consumer device (e.g., a human, or an application executing on a consumer device) and a consumer device used by, or operating as, a consumer to access a cloud and/or resources thereof.

It will be apparent to one of ordinary skill in the art that a "cloud consumer" can be any entity external to a cloud that can access the cloud by one or more consumer devices connected to on-demand networks to receive computing services provided by the cloud.

A cloud computing model can include at least five characteristics, at least three service models, and at least four deployment models.

Cloud computing comprises at least these five characteristics:

On-demand self-service: a consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client (e.g., consumer device) platforms (e.g., mobile phones, laptops, and PDAs).

Resource pooling: a provider's computing resources are pooled to serve multiple consumers using a multi-consumer model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Cloud computing comprises at least three service models:

Software as a Service (SaaS): the consumer is provided with the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the consumer is provided with the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the consumer is provided with the capability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Cloud computing comprises at least these four deployment models:

Private cloud: the cloud infrastructure is operated solely for an organization. It can be managed by the organization or by a third party, and can exist on or off the consumer premises, or can exist in a combination of both on and off the consumer premises.

Community cloud: the cloud infrastructure is shared by more than one organization and supports a specific community that has shared concerns (e.g., mission, security requirements, policy, and compliance considerations). It can be managed by the organizations or by a third party and can exist on or off the consumer premises, or can exist in a combination of both on and off the consumer premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud is service oriented with a focus on statelessness, low coupling, modularity, and semantic interoperability. At the heart of cloud computing is an infrastructure that includes a network of interconnected nodes. FIG. 1 illustrates example cloud 50. As shown, cloud 50 includes one or more cloud computing nodes 10, Consumer (e.g., computing) devices used by, or operating as, cloud consumers—such as, for example, personal digital assistant (PDA) or cellular telephone 54A, desktop computer 54B (which can, alternatively, be a server or other type of computer), laptop computer 54C, and/or automobile computer system 54D—can communicate with nodes among nodes 10. Nodes 10 can include computing devices such as, for example, mainframe computers, server computers, storage systems, and/or storage servers, and network components, such as switches, gateways, and/or routers. Nodes 10 can include, for example, compute nodes, storage nodes, network nodes, and/or virtualization instances (e.g., virtual machines) that can execute on computing devices among the nodes.

Nodes 10 can communicate with one another, such as by, for example, Local Area Networks (LANs), Wide Area Networks (WANs), point-to-point links, and/or I/O buses, or combinations of these, within and/or connected to the cloud. They may be grouped (not shown) physically or virtually, in one or more computing clouds, such as Private, Community, Public, or Hybrid clouds as previously described herein, or a combination thereof. This allows cloud 50 to offer infrastructure, platforms and/or software as services for which a cloud consumer does not need to maintain resources on a local computing, or consumer, device. It is understood that the types of computing devices 54A-54D shown in FIG. 1 are intended to be illustrative only and that computing nodes 10 and cloud 50 can communicate with any type of computerized device over any type of network and/or network addressable connection (e.g., using a web browser).

Figure 2:
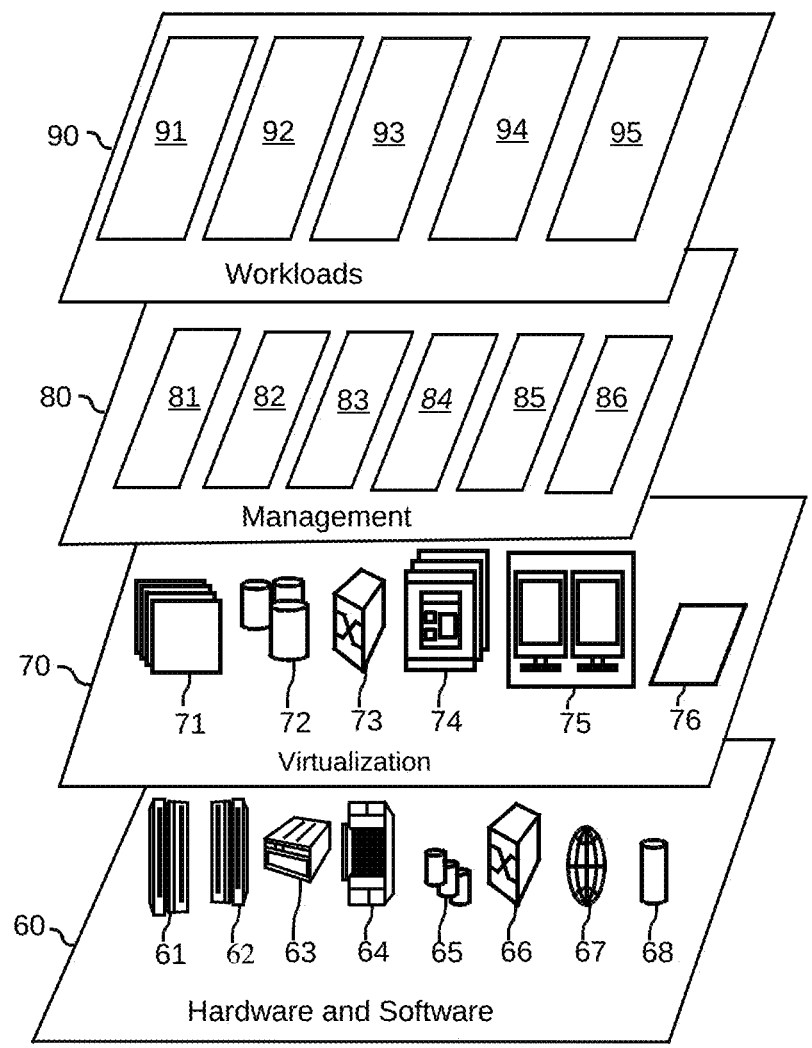
FIG. 2 depicts cloud computing abstraction model layers, according to aspects of the disclosure.

FIG. 2 illustrates an example set of functional abstraction layers that a cloud, such as 50 in FIG. 1, can provide. It should be understood that the components, layers, and functions shown in FIG. 2 are intended to be illustrative only and embodiments are not limited thereto. For example, while FIG. 2 illustrates various components and functions of a cloud computing system as organized into particular example abstraction layers, it is not necessary that components or functions of a cloud be organized according to the particular abstraction layers illustrated in FIG. 2, be implemented within a particular one of these layers, or be constrained to a particular one of these (or, other) layers. Rather, it would be apparent to one of ordinary skill in the art that embodiments can organize components, layers, and functions performed within a cloud utilizing more or fewer layers, or differing types of layers, than as shown in the example of FIG. 2.

As depicted in FIG. 2, hardware and software layer 60 includes software and hardware components. In some embodiments, software components can include network software 67 and database software 68. Examples of hardware components include: mainframes 61, RISC (Reduced Instruction Set Computer) architecture based servers 62, rack mount servers 63, blade servers 64, storage devices 65, and networks and networking devices 66. Network components 66 can include, for example, network routers and/or gateways, network adapters, or "network interface cards (NICs)", and/or network ports. As used herein, "NIC" refers to any form of network interface card that can interconnect processors and/or memory of a computer to a communications network, such as an Ethernet, or other type of physical communications network.

In embodiments, servers 61-64 can include processors and memories, storage devices and/or media, and network hardware. For example, servers 61-64 can include storage similar to storage 65, and/or network components similar to 66, as components within the servers or can access storage, such as 65, and/or network hardware, such as 66, as components external to the servers within a cloud such as 50 in FIG. 1.

Virtualization layer 70 can provide virtual entities such as (for example) virtualization instances (e.g., virtual machines or servers) 71, virtual storage 72, virtual networks 73 (which can include virtual private networks and/or virtual local area networks, or "VLANs"), virtual applications and operating systems 74, and virtual clients 75. In embodiments, virtualization layer 70 can include virtual devices (not shown in FIG. 2), such as, for example, virtual processors, virtualized memory, virtual disks (e.g., virtual hard drives), and virtual network devices (e.g., virtual network adapters and/or network ports).

Also in embodiments, a virtualization layer, such as 70, can include virtualization functions such as hypervisor 76. A hypervisor can operate to create virtual entities and/or virtual devices, and can operate to manage use of virtual entities and/or devices by components of other layers. A hypervisor can be implemented in various embodiments as firmware or an operating system, an application executing within an operating system, and/or a combination of any of these. Components of a hypervisor can be components of hardware and software layer 60, of virtualization layer 70, or components of both of these layers.

Management layer 80 can provide, in some embodiments, computing and cloud system management functions. Resource provisioning 81 can provide, for example, dynamic procurement of computing resources and other resources that are utilized to perform tasks within the cloud, such as components of hardware and software layer 60, and/or virtual entities and/or virtual devices included in layer 70. Metering and Pricing 82 can provide, for example, cost tracking as resources are utilized within the cloud, and billing or invoicing for consumption of these resources. In one example, these resources can include application software licenses.

User portal 83 can provide, for example, access to the cloud by consumer devices (a consumer device used by, for example, a system administrator). Service level management 84 can provide, for example, cloud computing resource allocation and management such that required service levels are met. Service Level Agreement (SLA) planning and fulfillment 85 can provide, for example, pre-arrangement for, and procurement of, cloud computing resources for which a future requirement is anticipated in accordance with an SLA. Security 86 can provide, for example, identity verification for cloud consumers, consumer devices, and/or tasks or computing applications, as well as protection for data and other resources.

Workloads layer 90 can provide functionality for which the cloud may be utilized. For examples, workload layer 90 can provide workloads and functions such as mapping and navigation 91, software development and lifecycle management 92, virtual classroom education delivery 93, data analytics processing 94, and transaction processing 95.

Individual consumers (or, alternatively, individual groups of related users) can require a secure and exclusive computing environment to execute workloads providing cloud services to consumer devices used by those consumers. Various software and/or hardware technologies are known to provide secure, exclusive computing environments. For example, Virtual Machines (VMs) and software containers (e.g., Linux Containers), and "physical partitions", which rely on partitioning of hardware within a computing system based on strict physical (e.g., hardware unit) boundaries, are examples of technologies that can provide a secure, exclusive computing environment for consumer devices to access a cloud. Clouds can implement secure, exclusive computing environments for consumer devices to access cloud computing resources using any particular one, or any particular combination, of such technologies. As used herein, "Virtualization Instance", or "VI", refers to any computing technology—such as VMs, containers, and/or physical partitions—that can provide a cloud consumer device with a secure and exclusive computing environment. In providing cloud services to a particular consumer device, a cloud can employ one or more of such VIs to provide cloud services to a particular consumer device, or a plurality of consumer devices, according to the manner in which the cloud provides services to the consumer devices.

VIs can include virtual devices, such as virtual processors, virtual memory, virtual storage, and/or virtual network devices, such as previously described in reference to FIG. 2 layer 70. Embodiments can implement VIs and/or virtual devices using, for example, hardware components within the cloud, such as within servers 61-64, storage 65, and network components 66 of layer 60 in FIG. 2. Embodiments can include, for example, virtual processors corresponding to physical components within a server such as processors (or, components thereof, such as processor thread), virtual memory corresponding to physical memory, and virtual network devices corresponding to physical network adapters and/or physical network ports.

Figure 3:
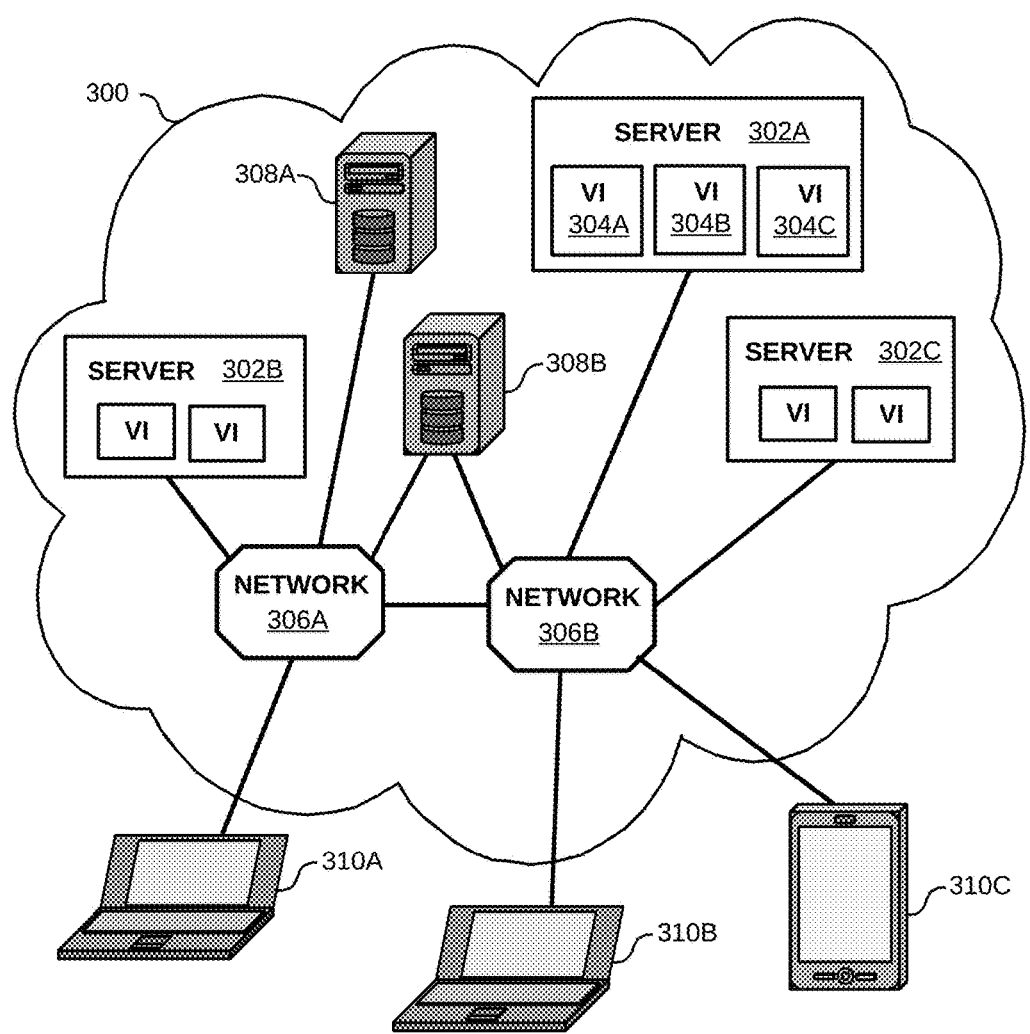
FIG. 3 illustrates an example cloud computing environment including virtualization instances, according to aspects of the disclosure.

FIG. 3 illustrates an example embodiment of a cloud that can provide secure, exclusive computing environments to consumer devices using VIs. Cloud 300 in FIG. 3 is simplified to illustrate the disclosure but is not intended to limit embodiments. Cloud 300 includes application servers 302A, 302B, and 302C (collectively, "servers 302"), networks 306A and 306B, and storage servers 308A and 308B. Consumer devices 310A, 310B, and 310C (collectively, "consumers 310") are connected to computing resources of cloud 300 (and, possibly to each other) by means of connections to one of networks 306A and 306B. Using these network connections, consumers 310 can access computing resources of cloud 300, such as one or more of servers 302, and/or one or more of storage servers 308A and 308B.

Servers 300 further include VIs, such as illustrated by VIs 304A, 304B, and 304C (collectively, "VIs 304) hosted (or, "executing") on server 302A. VIs 304 can provide a secure, exclusive computing environment for consumer devices among consumers 310. Cloud 300 can allocate one or more of VIs 304 to particular consumer devices, among consumers 310, and the consumer devices (and/or consumers using those consumer devices) can specify particular SLA requirements to a cloud provider owning or managing cloud 300.

VIs can provide consumer devices with physical and/or virtual computing resources associated with a server hosting one or more VIs (referred to herein as a "hosting server"). Virtual resources, in particular, can enable a cloud to share physical computing resources in a highly flexible manner, such as dynamically changing the amount, type, and/or physical location, of a computing resource (or, device) as the computing resource demands of consumer devices, cloud services, VIs, and/or servers change while a cloud is providing cloud services. Physical computing resources that can be virtualized include, for example, physical processor cores and/or threads of processor cores; physical memory units or regions of memory units; storage devices, such as disk or solid state drives; and/or, network devices such as network adapters (or, in some embodiments, NICs), or facilities of such adapters, such as network ports.

Figure 4:
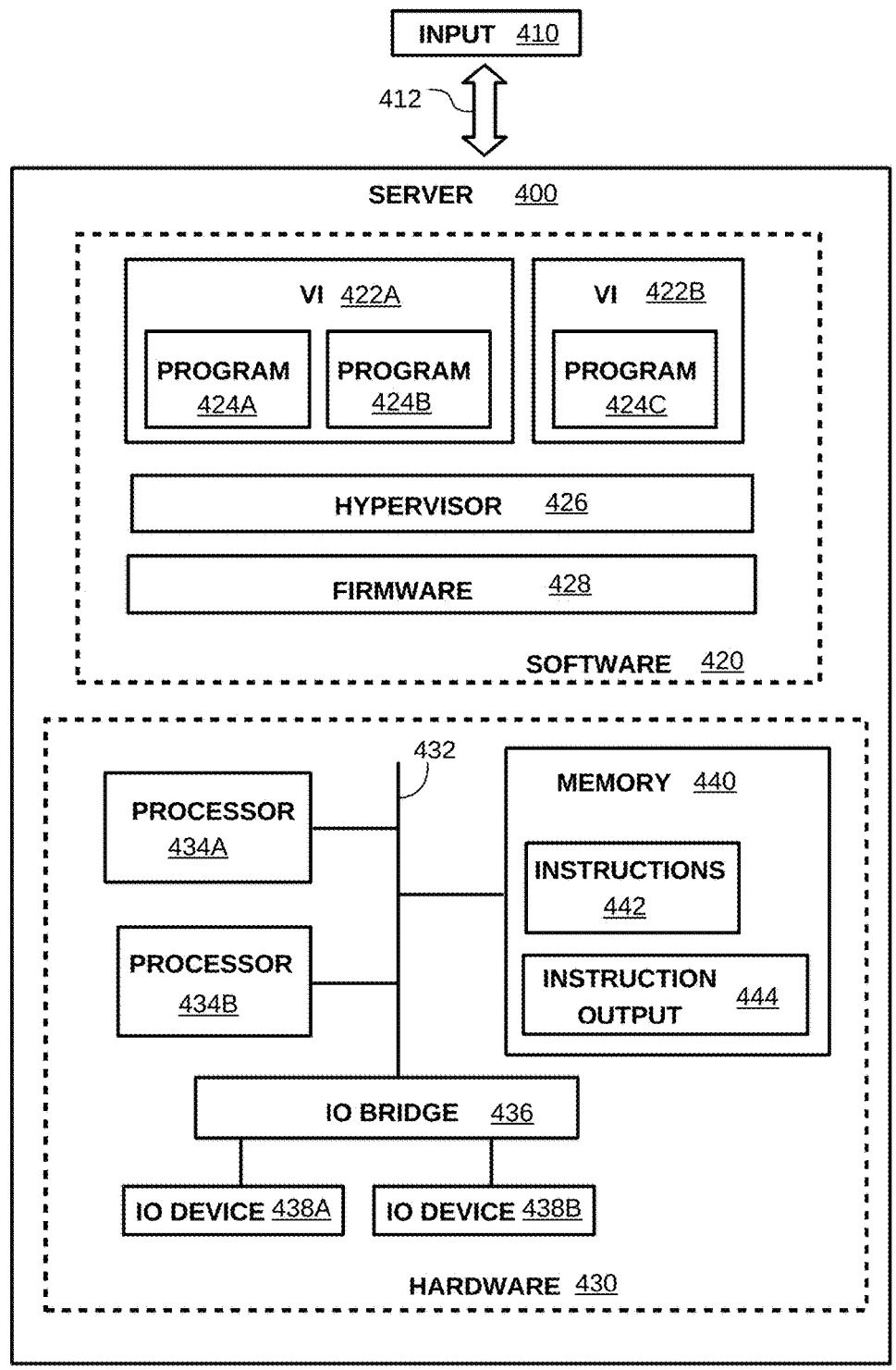
FIG. 4 illustrates an example server suitable for a cloud computing environment, according to aspects of the disclosure.

FIG. 4 illustrates an example embodiment of a computer having physical resources that can be virtualized and included, in virtualized form, in one or more VIs to provide cloud services and/or resources to consumer devices. Server computer 400 (hereinafter, "server 400") can be a server computer, such as one of servers 302 in FIG. 3 or servers 61, 62, 63, and/or 64 in FIG. 2, included in\ a cloud. Server 400 includes hardware components 430, which include physical processors 434A and 434B and physical memory 440 interconnected by means of interface 432, which can be, for example, a processor or memory bus, or other forms of component interconnections known in the art. Memory 440 contains instructions 442 (e.g., programs) which processors 434A and/or 434B can execute, and instruction output 444, which can be the results of the processors executing instructions 442, for example. While not shown in FIG. 4, memory 440 can also include data used by programs executing on processors 434A and/or 434B.

Hardware 430 also includes input/output (I/O) devices 438A and 438B, connected to processors 434A and 434B, and memory 440, by means of I/O bridge 436. I/O devices 438A and 438B can devices such as keyboards, mice, network interface devices, storage devices (e.g., disk or solid state disk storage) and/or storage interface devices. In some embodiments, I/O devices 438A and 438B can be, for example, network adapters, which can include network ports that connect to a network (e.g., an Ethernet, or the Internet) and can enable processors 434A and/or 4334B to communicate with computing devices connected to that network.

Server 400 is depicted having software components 420. Software components among 420 include firmware 428, hypervisor 426, VIs 422A and 422B, and programs 424A, 424B, and 424C (referred to collectively herein as "programs 424") hosted by the VIs. The term "software", as used herein, should be understood to encompass all varieties of computer program embodiments comprising computer-executable instructions, such as micro-code, milli-code, firmware, software loaded from a storage medium, licensed program products, and such other varieties of computer program embodiments as are known to those of ordinary skill in the art.

VIs 422A and 422B can be VMs, containers, physical partitions of server 400 hardware 430, or combinations of these. Programs among programs 424 can be, for example, software containers (e.g., within a VM), components of an operating system, and/or application programs. Programs among programs 424 can be accessed and/or used by consumer devices, or by a VI, while server 400 is used by a cloud to provide cloud services to those consumer devices. Some or all of software components 420 can be embodied within instructions 442 stored in memory 440, and some or all of the results, and/or data used by, programs executing in server 400 can be stored in memory 440 as instruction output 444. Alternatively, some of all of software components 420 can be embodied in other media (not shown), such as Non-Volatile Random Access Memory (NVRAM) or flash memory, hard drive or solid state disk (SSD), compact disk (CD), and/or digital video disk (DVD), for example.

Firmware 428 can include, for example, instructions (e.g., programs) that enable programs, such as hypervisor 426, programs among programs 424, programs included in firmware 428, and/or other programs (not shown) that can execute in server 400, to manage, monitor, and/or control components within hardware 430. Hypervisor 426 can operate to create and/or manage VIs, such as 422A and 422B. Hypervisor 426 can be embodied as an operating system, or component thereof, executing within server 400. In alternative embodiments, hypervisor 426 can be "built-in" within server 400, such as comprising one or more programs embodied wholly or partially in firmware 428.

Programs within a VI can create and/or manage other VIs, either external to or within that VI. A hypervisor, VM, or other form of VI, can create and/or manage other VIs. For example, a hypervisor can create and/or manage VMs; a VM operating as a "host" VM (or, hypervisor) can creating and/or manage guest VMs; and, an operating system executing in a VM can create and/or manage software container VIs within that VM. Hypervisor 426, and/or VIs 422A and 422B, create and/or manage "virtual devices" (not shown) associated with physical resources among hardware 430, such as virtual processors, virtual storage devices, and/or virtual network devices. Programs operating in (or, "hosted" by) VIs 422A and/or 422B can provide cloud services to consumer devices and can utilize virtual devices in providing those services. Hypervisor 426 can manage and/or dynamically allocate and/or de-allocate particular virtual devices to VIs 422A and/or 422B. VIs 422A and 422B can manage and/or dynamically allocate and/or de-allocate particular virtual devices to programs operating within these VIs (including VIs encapsulated within VIs 422A and/or 422B, such as containers within a VM).

Server 400 can receive input 410 (e.g., from one or more computing devices external to server 400) by means of interface 412. Interface 412 can be any of a variety of interfaces known in the art to communicatively couple functions and/or components of one computing device or system (e.g., a computing device that can provide input 410 to server 400), with functions and/or components of the same or, alternatively, another computing device or system (e.g., server 400). Examples such interfaces include: a network or other communications interface; an I/O or processor bus or interconnect; a shared memory; a messaging interface; a program call, exception, or interrupt; and, so forth as are common in the art. In alternative embodiments, interface 412 can be an interface internal to server 400, such as among the examples just described, and can couple components internal to server 400 (e.g., components of software 420 and/or hardware 430).

Input 410 can be, for example, data or instructions to direct server 400 to perform particular operations or, in another example, to report operating conditions of server 400 or components thereof (e.g., one or more components among software 420 and/or hardware 430). Input 410 can be associated with services delivered to consumer devices by a cloud that includes server 400. For example, input 410 can be a program (e.g., an application or workload) and/or data to execute on server 400 for a consumer device accessing the cloud services. In another example, input 410 can be instructions to server 400 (or, components thereof) to perform particular operations associated with providing cloud services to a consumer device, such as instructions directing server 400 to modify resources of server 400 (e.g., components of software 420 and/or hardware 430) used in providing the cloud services.

While FIG. 4 illustrates server 400 as having particular hardware and software components, this is not intended to limit embodiments. Rather, it will be appreciated by one of ordinary skill in the art that embodiments can include a variety of other hardware and/or components in addition to and/or different from those illustrated in FIG. 4. It will be further appreciated by one of ordinary skill in the art that embodiments can include more or fewer instances of components illustrated in FIG. 4, such as more or fewer VIs and/or programs, memories, processors, etc.

Figure 5:
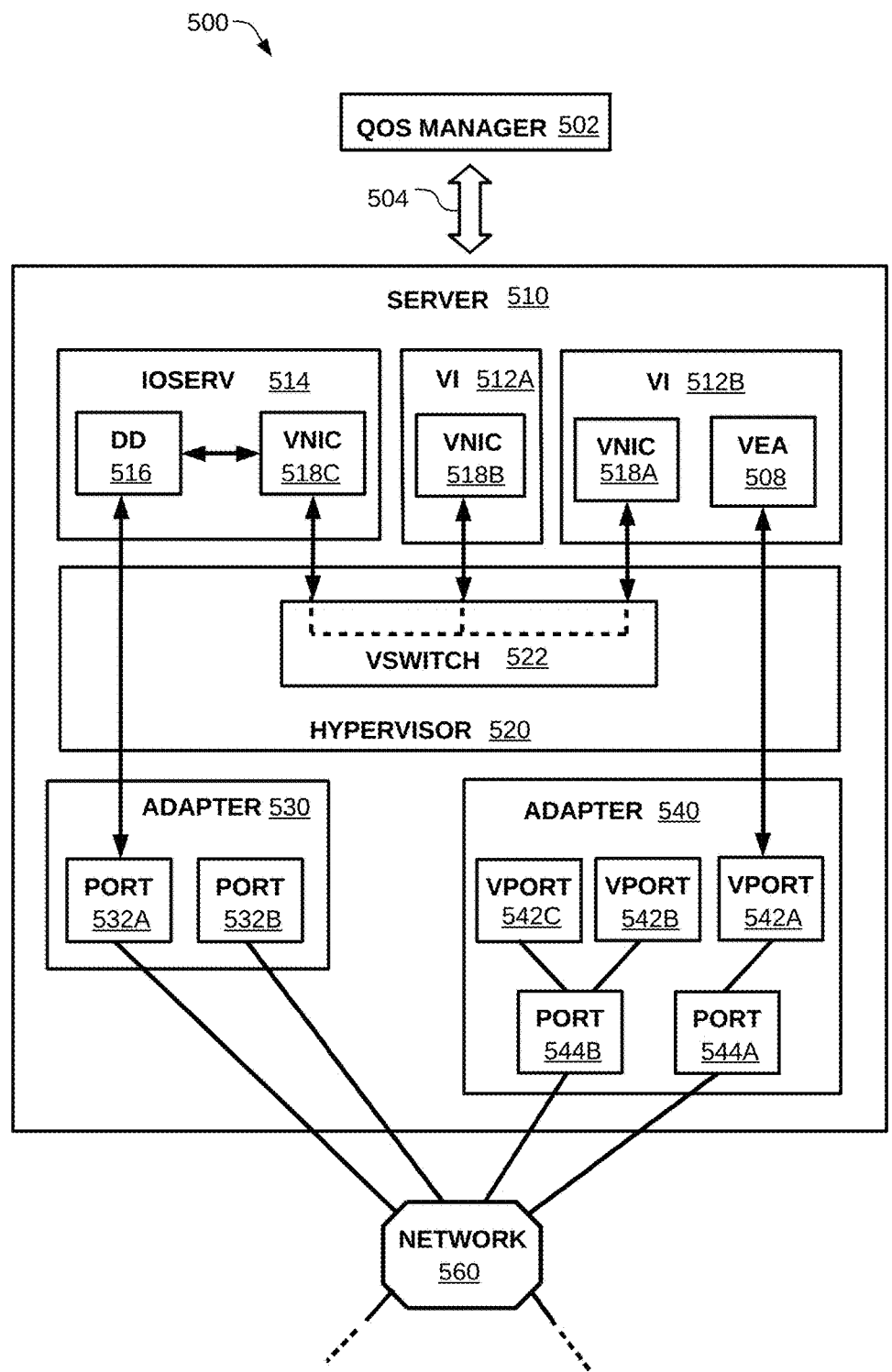
FIG. 5 illustrates an example system for managing cloud computing resources cloud, according to aspects of the disclosure.

FIG. 5 illustrates an example system for managing virtual resources in a computer and/or cloud computing environment. System 500 includes QoS manager 502 and server 510, which can be a server (i.e., a computer) similar to computer 400 of FIG. 4. QoS manager 502 and server 510 are shown communicatively coupled by means of interface 504. QoS manager 502 can be, for example, a component or function operating in one or more computing devices communicatively coupled to server 510 by means of interface 504. Interface 504 can be any of a variety of interfaces known in the art, to communicatively couple computing devices, such as previously described in reference to interface 412 of FIG. 4, and which can enable QoS manager 502 to communicate with server 510 or components thereof. In alternative embodiments, QoS manager can be a component of server 510 and interface 504 can be an interface internal to server 510 (e.g., such as those previously described in reference to interface 412 of FIG. 4)

For simplicity of the illustration, server 510 is shown without all of the hardware components 430 and software components 420 illustrated in the example of FIG. 4; However, it will be understood by one of ordinary skill in the art that server 510 can have similar hardware and/or software components, and these can be configured similarly to the manner of example server 400 of FIG. 4. Server 510 can be a node included in a cloud, such as a node among nodes 10 of FIG. 1.

Server 510 includes hypervisor 520 and VIs 512A and 512B. Consumer devices accessing a cloud that includes server 510 can use, or access, VIs 512A and/or 512B to receive cloud services. Server 510 further includes network adapter 530 (hereinafter, "adapter 530") and network adapter 540 (hereinafter, "adapter 540"). Adapter 530 includes physical network ports 532A and 532B and adapter 540 includes physical network ports 544A and 544B. Physical ports 532A, 532B, 544A, and 544B can, in turn, connect server 510 to network 560, which can be, for example, a network such as an Ethernet or the Internet. While not shown in FIG. 5, consumer devices, and/or other components of a cloud providing cloud services to consumer devices, can connect to server 510 by means of network 560 (or, alternative networks not shown in FIG. 5) and can receive cloud services from server 510 by means of network 560 (or, alternative networks not shown in FIG. 5).

A server, such as 510, can include virtual devices corresponding to physical hardware resources in the server, and the virtual devices can be used by VIs to provide cloud services to consumer devices. As previously described, virtualizing physical resources of a server (e.g., network adapters) can allow for more efficient sharing of those physical resources by multiple components (e.g., VIs) of a computing system, where capacity of those physical resource might be otherwise un- or under-utilized if fully dedicated to a single element (e.g., a single VI). Virtual devices can include virtual network devices, such as a virtual network interface card (VNIC), a virtual switch (VSWITCH), and a virtual Ethernet adapter (VEA).

Server 510 includes virtual network devices VSWITCH 522, VNICs 518A-518C (collectively, "VNICs 518"), and VEA 508. Hypervisor 520 (or, in alternative embodiments, another virtualization function or component of a computing system) can create the server 510 virtual network devices utilizing physical network devices of server 510, such as adapters 530 and 540 and their respective physical ports 532A, 532B, 544A, and 544B. The server 510 virtual network devices can be virtual instances of underlying physical (e.g., hardware) devices. As shown, VEA 508 is a virtual instance of underlying adapter 540, VPORT 542A, and port 544A, and each of VNICs 518 are virtual instances of underlying adapter 530 and port 532A.

VIs 512A and/or 512B can utilize the server 510 virtual network devices to communicate, over network 560 and/or VSWITCH 522, with other VIs within server 510 or other computing components within or external to server 510, such as other servers within or external to the cloud, and/or consumer devices. A cloud can use VIs 512A and/or 512B to provide cloud services to consumer devices, and VIs 512A and/or 512B can, in turn, utilize the virtual network devices in providing those services.

In embodiments, physical (e.g., hardware) resources and/or devices can be of such a design that they provide particular functions, such as network functions, but do not provide any additional capabilities particularly in support of virtualizing those hardware resources and/or devices. As used herein, "adapter" refers to a computing device adapted to provide or perform functions associated with computer or computing system I/O. As used herein, "non-virtualizing adapter" refers to an I/O adapter that does not include intrinsic capabilities (i.e., within the adapter) directed towards virtualizing components or functions of that adapter (or, computing device). Accordingly, to provide virtual resources using a non-virtualizing adapter, embodiments can require software to emulate functions required for virtualization of a non-virtualizing adapter. A hypervisor (for example), or other virtualization function or component of a computing system, can implement virtual resources, and/or virtual devices, as software functions and/or components that utilize the resources and capabilities of an underlying physical adapter.

For example, an embodiment can require software (as one or more programs particular to computing resource type) to implement virtual devices, such as VNICs 518, and/or VSWITCH 522. As used herein, but not intended to limit embodiments, "VNIC" refers to a virtual network device (e.g., a virtual network interface card or network port) utilizing an underlying non-virtualizing network adapter. Embodiments can virtualize resources of a non-virtualizing adapter using, for example, an I/O server. I/O server 514 can function as an intermediary between VNICs in VIs of server 510 to share resources of adapter 530 and/or to communicate with network 560. I/O server 514 can be a VI, or other program(s), executing independently or, alternatively, within a VI of server 510.

I/O server 514 includes device driver 516 and VNIC 518C. Device driver 516 can be, for example, a program designed to control adapter 530 and/or ports 532A and 532B. VNIC 518C can utilize device driver 518 to utilize functions of adapter 530 and/or ports 532A and/or 532B. Hypervisor 520 (or, alternatively, I/O server 514) can create VNIC 518C to enable VIs 518A and/or 518B to communicate with VNIC 518C to share adapter 530 and/or ports 532A and 532B. Hypervisor 520 can create VSWITCH 522 to enable VNICs in other VIs (e.g., 518A and/or 518B) to communicate with VNIC 518C.

A disadvantage of providing virtual devices using an underlying non-virtualizing adapter can be that software components implementing the virtual devices, or included in the communications paths of a virtual device, can increase utilization of processors in a server executing these software virtualization functions (which can in turn reduce virtual device bandwidth and/or throughput) and/or can add latency to virtual device operations (which can, in turn, reduce overall virtual device throughput). For example, VSWITCH 522, VNIC 518C, and device driver 516 underlying and in the communications paths of VNICs 518A and/or 518B to adapter 530 and/or network 560 can increase utilization of processors in server 510 used by I/O server 514 and can increase network latency (with possible accompanying reductions in throughput) for VI 512A and/or 512B network communications.

As alternative to or, in addition to, implementing virtual devices using underlying non-virtualizing adapters, embodiments can implement virtual devices using a "self-virtualizing" type of adapter. A self-virtualizing adapter is a type of adapter that has intrinsic capabilities to virtualize functions of the adapter. An advantage of implementing virtual devices using a self-virtualizing adapter can be that a self-virtualizing adapter can avoid the need to implement virtual resources in software interfacing with the adapter, and the associated software performance overhead. For example, a self-virtualizing adapter can provide resources and functions internally that can create a virtual port, or "VPORT", within the adapter itself, utilizing only resources (such as hardware specific to virtual instances of adapter facilities or resources) internal to the adapter. Accordingly, self-virtualizing adapters can reduce or avoid additional software virtualization functions (e.g., a VSWITCH and/or an I/O server) between a virtual device and the underlying self-virtualizing adapter, which can in turn reduce or eliminate performance overhead associated with such software virtualization functions.

Adapters that conform to the Peripheral Component Interface-Express (PCI-E) Single-Root I/O Virtualization (SR-IOV) design standard are an example of self-virtualizing adapters. PCI-E SR-IOV adapters (hereinafter, "SR-IOV adapters") can provide "Virtual Functions (VFs)" associated with particular physical devices (e.g., physical ports) of an adapter and that are virtual instances of those physical devices. For example, an SR-IOV network adapter can embody a VPORT as a VF of the adapter and associated with particular physical resources of the adapter (e.g., Ethernet network ports).

In some embodiments, particular SR-IOV VFs of the same adapter can be of different types. For example, an Ethernet type SR-IOV adapter can have one or more Ethernet ports and can provide either or both Ethernet VFs and, for example, Fiber Channel Over Ethernet (FCoE) VFs, which function as Ethernet protocol or FCoE protocol virtual devices, respectively. In some embodiments, Ethernet and FCoE VFs provided by an Ethernet SR-IOV adapter can be configured to share the same physical Ethernet port or to operate using different physical ports.

Referring again to the example of FIG. 5, adapter 540 can be a self-virtualizing adapter and can provide virtual instances—VPORTs 542A, 542B, and 542C—of physical ports 544A and/or 544B within adapter 540. For example, adapter 540 can be an SR-IOV adapter and VPORTs 542A, 542B, and 542C can be implemented as SR-IOV VFs within adapter 504. VEA 508 can interface directly with VPORT 542A to communicate with network 560. In some embodiments VEA 508 can embody functions to directly control and/or manage hardware elements of adapter 540 encapsulated within VPORT 542A, an/or to communicate with network 560, in a manner similar to the manner in which device driver 516 can directly control and/or manage hardware elements of adapter 530 and communicate with network 560. In this way, self-virtualizing adapter 540 can avoid most or all of the software performance overhead associated with VNICs 518A and 518B accessing facilities of adapter 540 and/or network 560.

While a self-virtualizing adapter of a particular type (e.g., a two-port 10 gigabit Ethernet adapter) can provide higher performing virtual devices than a comparable non-virtualizing adapter, such self-virtualizing capabilities can also increase the cost of that self-virtualizing adapter in comparison to the comparable non-virtualizing adapter. Accordingly, a computer server can be configured to utilize a greater number of non-virtualizing adapters than self-virtualizing adapters. An administrator, or management function, of a computer server can prefer to configure virtual devices to use lower-cost non-virtualizing adapters where such virtual devices can meet performance requirements of VIs to deliver cloud services to particular consumer devices, or to provide a higher level of availability of higher performing self-virtualizing adapters for server operations or cloud services require that that level of performance. Where particular VIs require higher performance to deliver cloud services to particular consumer devices, a computer server (or, an administrator or management function of a computer server) can configure virtual devices for these VIs that use higher performing self-virtualizing adapters.

Consumers using cloud services can have a Service Level Agreement (SLA), or other form of agreement, with a cloud service provider that can specify requirements that the cloud service provider must meet when delivering services to the consumer, and/or consumer device(s) used by the consumer, such as particular cloud computing performance requirements. Such requirements can be associated with Quality of Service (QoS) levels provided by cloud computing resources to particular consumer devices. For example, QoS settings can be specified for one or more particular VIs used, or accessed, by particular consumer devices.

QoS settings can specify particular QoS requirements (e.g., minimum QoS levels), VI QoS objectives (e.g., QoS goals that are not necessarily requirements), or a combination of these, for one or more of the VIs providing cloud services to a particular one or more consumer devices. QoS requirements can include particular expected levels of performance, for example, such as a level of processor, network, and/or storage performance and/or capacities provided to a VI. QoS objectives can include a desired, or preferred, level of performance. A consumer may be willing to pay higher service costs to obtain preferred performance levels included in QoS objectives. QoS settings can include particular consumer criteria under which a cloud service provider (or, a VI used to provide cloud services) should provide a particular level of service, such as at particular times of day, at particular levels of utilization of one resource (e.g., increased network bandwidth corresponding to increased processor utilization by a VI). As used herein, "VI QoS objectives" comprises at least VI QoS objectives, QoS requirements, and consumer criteria that can be included in QoS settings associated with particular VIs in providing cloud services to particular consumer devices using those VIs.

A cloud service provider can meet VI QoS objectives of one or more particular consumer devices, as represented in QoS settings for (i.e., associated with) those consumer devices, through various means of managing computing resources within a cloud. For example, as a particular VI increases the demand (e.g., throughput, or utilization) placed on a computing resource (e.g., a network resource), or the ability of cloud resources used by a VI to deliver cloud services decreases, a cloud can substitute higher performing virtual resources for those presently in use by the VI to meet corresponding VI QoS objectives. Alternatively, as a particular VI decreases the demand (e.g., throughput, or utilization) placed on a computing resource (e.g., a network resource), or the ability of cloud resources used by a VI to deliver cloud services increases, a cloud can substitute lower performing virtual resources for those presently in use by the VI and continue to meet corresponding VI QoS objectives.

To illustrate, but not intended to limit embodiments, server 510 of FIG. 5 can be a server in cloud 300 of FIG. 3, and cloud 300 can include QoS manager 502 in FIG. 5 in communication with server 510 as illustrated in FIG. 5. Server 510 can be used by cloud 300 to provide cloud services to consumer device 310A, for example, and consumer device 310A can use VI 512B to access or receive those cloud services. As will be described, QoS manager 502 can operate to manage virtual resources used by VI 512B to provide cloud services to consumer device 310A.

Consumer device 310A can have an SLA that determines or specifies particular QoS settings for delivering cloud services to consumer device 310A. The QoS settings can, optionally, also specify a preferred level of network performance. In some embodiments, a cloud service provider can charge a greater than prevailing charge for cloud services when providing the preferred levels of network performance; and, a consumer device, such as 310A, may be willing to pay that greater charge and this can be included in QoS settings associated with providing cloud services to consumer device 310A. The QoS settings can correspond to particular QoS objectives associated with VI 512B, and the QoS objectives can include a particular minimum level of network performance (e.g., data rate, bandwidth, and/or network latency, such as Internet Protocol, or "IP", packet latency) required by VI 512B to meet those objectives.

A cloud (or, the cloud service provider owning cloud 300) can have a resource management policy to select particular virtual network resources for us by VIs to provide cloud services to consumer devices. For example, a resource management policy can preferably select the lowest capacity network resources possible to meet the network QoS settings of any particular VI, or to preferably leave higher performing (and, possibly more expensive) network resources available for VIs having higher QoS network performance objectives. A resource management policy can preferably leave higher performing (and, possibly more expensive) network resources available for delivering services to consumer devices used by consumers willing to pay higher than prevailing charges for those resources.

QoS manager 502 (or, other components of cloud 300 and/or server 510) can implement a resource management policy and select a particular virtual network device to provide network services to a VI based partially, or wholly, on the policy in combination with QoS objectives for a particular VI. For example, either of VEA 508 or VNIC 518A can provide network services for VI 512B to deliver services to consumer device 310A. VNIC 518A utilizes adapter 530, which can be a lower cost (in some embodiments, possibly much lower cost) than adapter 540, utilized by VEA 508. Provided VNIC 518A, using non-virtualizing adapter 530, can meet the VI 512B QoS objectives for delivering cloud service to consumer device 310A, and possibly based on a cloud 300 resource management policy, QoS manager 502 can prefer to select VNIC 518A and non-virtualizing adapter 530, as lower-cost and/or lower-performing than a virtual device using adapter 540, or to leave resources of higher performing adapter 540 available to select for other VIs having higher QoS performance objectives or willing to pay for higher performance.

However, while VI 512B is providing cloud services to consumer device 310A, VNIC 518A, and/or network components underlying VNIC 518A (e.g., VNIC 518C, DD 516, and/or adapter 530 and port 532A), can experience conditions that can cause VI 512B to no longer meet the VI 512B QoS objectives associated with consumer device 310A. For example, utilization of network components underlying VNIC 518A can increase and can result in VNIC 518A having insufficient network performance (e.g., reduced throughput or bandwidth, or increased latency) to meet VI 512B QoS objectives for delivering services to consumer device 310A. Alternatively, while providing services to consumer device 310A, VI 512B can increase the amount of network resources required to continue to meet VI 512B QoS settings associated for delivering those services. A QoS manager can detect such dynamic changes in the QoS provided to a VI and can act to modify which resources are provided to the VI s to deliver services efficiently and/or, possibly, at lowest costs to the cloud services provider and/or consumers.

For example, QoS manager 502 can monitor dynamic status of network components and/or resources underlying VNIC 518A, such as performance indicators (e.g., individual and/or aggregate component statistics) for VI 512B, VNIC 518A and/or network resources underlying VNIC 518A (VNIC 518D, VSWITCH 522, adapter 530, physical ports 532A and/or 532). QoS manager 502 can determine, based on these performance indicators, that VNIC 518A is unable to continue to meet the VI 512B QoS objectives for consumer device 310A. Alternatively, QoS manager 502 can determine that consumer device 310A QoS setting include a preference to, at a particular time or under particular conditions, use higher performing network resources than provided by VNIC 518A for VI 512B.

In response to changing operating conditions, and/or preferences, QoS manager 502 can act to transfer VI 512B network services from VNIC 518A to a higher performing virtual network device. For example, QoS manager 502 can act to transfer VI 512B network services (e.g., using hypervisor 520) from VNIC 518A to higher-performing VEA 508 and underlying VPORT 542A and port 544A of adapter 540. If VEA 508 has not already been created (e.g., by hypervisor 52), QoS manager 502 can act to create VEA 508 (e.g., by using hypervisor 520) to use resources of adapter 540, such as VPORT 542A and port 544A.

Alternatively, QoS settings associated with cloud services provided to consumer device 310A, VI 512B can require higher performing network resources, or consumer device 310A can be willing, or prefer, to utilize higher performing network resources, such as resources of higher-performing, self-virtualizing adapter 540. Accordingly, based on QoS objectives that require or prefer higher performing network resources, and/or a cloud 300 resource management policy, QoS manager 502 can prefer to select VEA 508 to provide a virtual network device to VI 512B for providing cloud services to consumer device 310A.

However, while utilizing VEA 508, VI 512B can, at times, require lower levels of network performance such that VEA 508 can surpass the QoS objectives (e.g., exceed particular performance levels) specified for consumer device 310A. QoS manager 502 can detect that VI 512B, at a particular time, and based on VI 512B using VEA 508, is surpassing QoS objectives associated with consumer device 310A. Accordingly, QoS manager 502 can determine that a VNIC using a lower-performing and possibly lower-cost, adapter, such as VNIC 518A using resources of adapter 530, can alternatively provide network services that meet those VI 512B QoS objectives. QoS manager 502 can act to transfer VI 512B network services from VEA 508 to VNIC 518A (including, if not already created, to create VNIC 518A).

Transferring network services for VI 512B from VEA 508 and adapter 540 to VNIC 518A and adapter 530, at times when VNIC 518A and adapter 530 can meet the VI 512B QoS settings for consumer device 310A, can enable cloud 300 to make adapter 540 higher performance resources available to VIs providing services to consumer devices accessing resources of cloud 300 that require such performance, or to consumer devices used by consumers that are willing to pay a higher cloud services price for such performance.

It will be appreciated by one of ordinary skill in the art that a QoS manager can be implemented in a variety of functions and/or components, or combinations of functions and/or components, of a cloud computing system. For example, QoS manager 502, can be implemented partially (or, alternatively, wholly) within components of server 510, such as I/O server 514, VIs 512A and 512B and/or hypervisor 520. QoS manager 502 can be implemented partially (or, alternatively, wholly) as a function of a computer (not shown in FIG. 3 or FIG. 5) in communication with server 510 (e.g., using interface 504).

It will be further appreciated by one of ordinary skill in the art that the ability of a VI to meet or surpass VI QoS objectives for a particular consumer device can continue to change dynamically while providing cloud services to that consumer device. It will be apparent to one of ordinary skill in the art that embodiments can continually swap resources used by a VI to provide cloud services to a particular consumer device, interchanging higher performing resources (e.g., VEAs) with lower performing resources (e.g., VNICs) and vice-versa, as the ability of the VI to meet or surpass QoS objectives corresponding to the consumer device changes over time.

Figure 6:
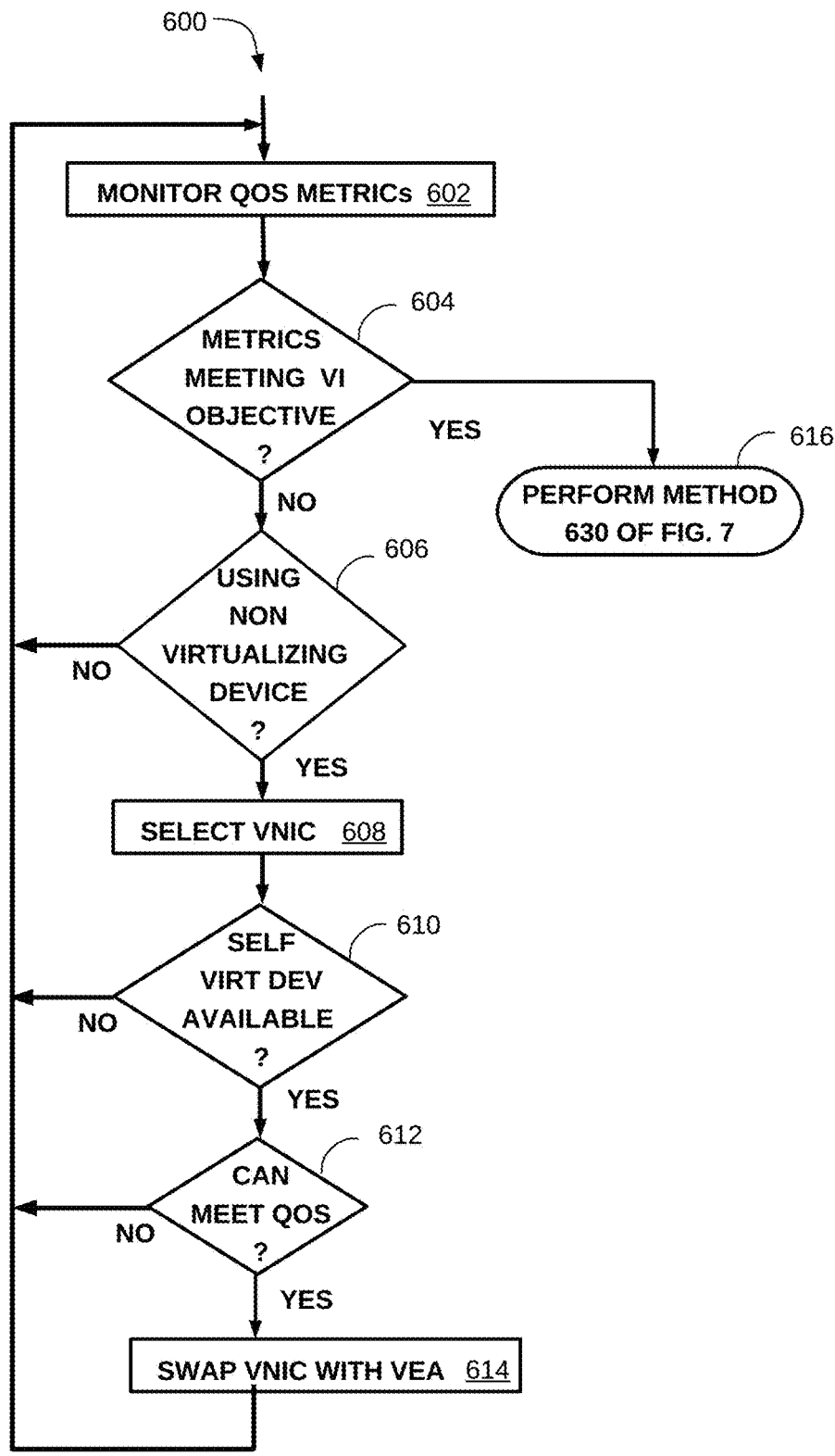
FIG. 6 is a flowchart that illustrates an example method for substituting non-virtualizing with self-virtualizing computing resources, according to aspects of the disclosure.
Figure 7:
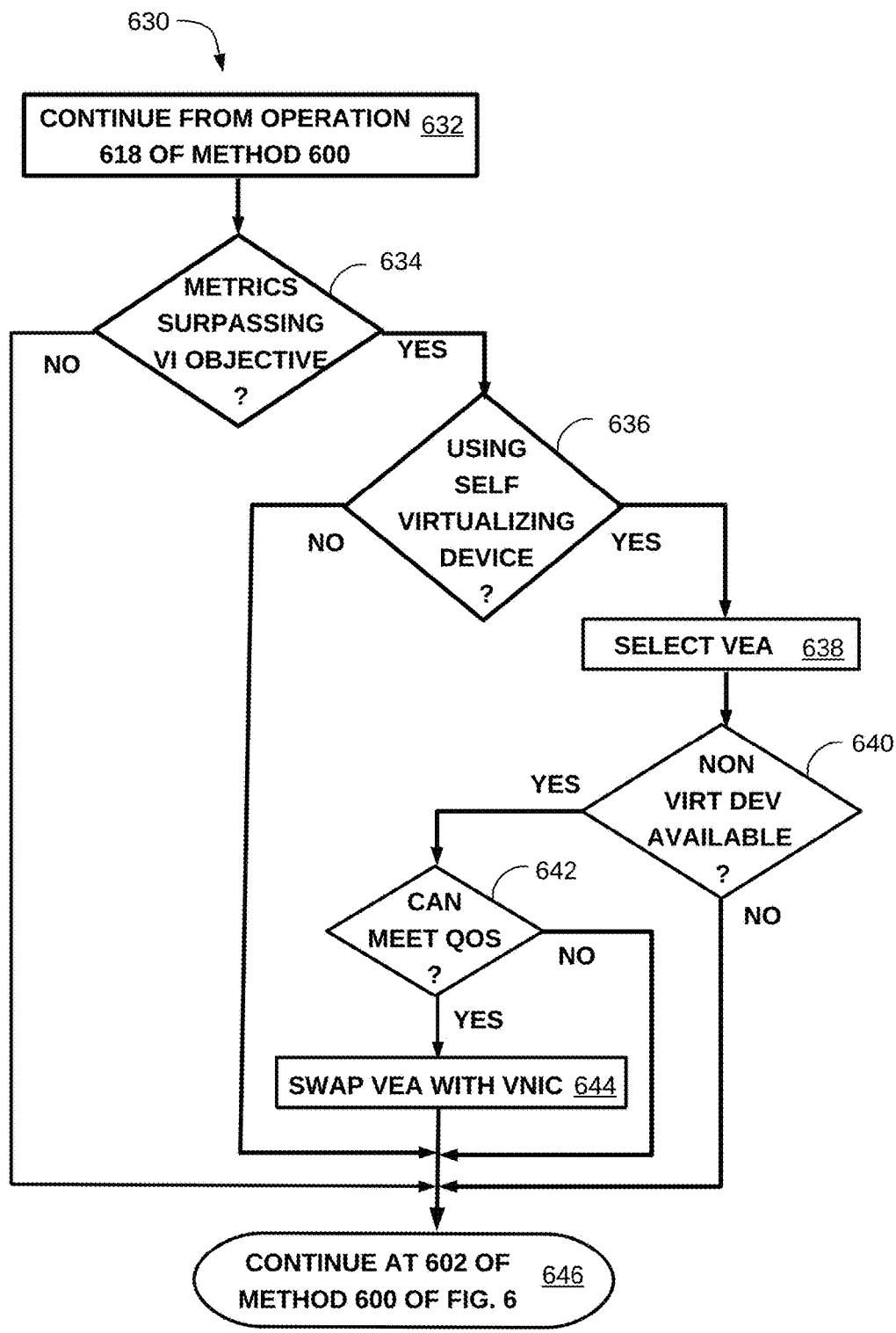
FIG. 7 is a flowchart that illustrates an example method for self-virtualizing substituting with non-virtualizing computing resources, according to aspects of the disclosure.

FIG. 6 illustrates example method 600, and FIG. 7 illustrates related example method 630, to manage cloud computing resources to meet VI QoS objectives associated with providing cloud services to a consumer device. Embodiments of methods 600 and 630 can detect that the performance of computing resources used by a VI to deliver cloud services to a consumer device are falling below VI QoS objectives or, alternatively, surpassing VI QoS objectives, and in response act to substitute different computing resources for those in use by the VI.

Embodiments can implement methods 600 and/or 630 using, for example, a system like system 500 in FIG. 5 as a component of a cloud. Accordingly, to illustrate the methods, but not intended to limit embodiments, methods 600 and 630 are as performed by a QoS manager, included in a cloud computing environment, managing virtual network devices providing network resources to VIs in servers within the cloud. Accordingly, with respect to the ensuing descriptions of methods 600 and 630:

"cloud" refers to a cloud similar to cloud 300 of FIG. 3 and including a system, similar to system 500 of FIG. 5, for managing virtual resources in a computer and/or cloud computing environment;

"non-virtualizing adapter" refers to an adapter similar to adapter 530 of FIG. 5, which can be, for example, network adapter type not having SR-IOV capabilities, and "VNIC" refers to a virtual network devices similar to VNIC 518A of FIG. 5;

"self-virtualizing adapter" refers to an adapter similar to adapter 540 of FIG. 5, which can be, for example, an SRIOV type network adapter, and "VEA" refers to a virtual network devices similar to VEA 508 of FIG. 5;

"server" refers to a server similar to server 510 of FIG. 5;

"consumer device", refers to a consumer device similar to those among consumers 310 of FIG. 3, used by a consumer to access services of the cloud;

"VI" refers to a VI, similar to VI 512B of FIG. 5, having particular VI QoS objectives associated with providing cloud services to a particular consumer device; and "QoS manager" refers to a QoS manager similar to QoS manager 502 of FIG. 5. However, it will be understood by one of ordinary skill in the art that illustrating methods 600 and 630 in this context is not intended to be limiting to embodiments.

Referring now to FIG. 6, at 602 of method 600 a QoS manager receives (or otherwise obtains) and monitors QoS metrics related to VIs operating in a server within a cloud to provide cloud services to consumer devices. At 602, the QoS manager can, for example, receive QoS metrics from components of the cloud (e.g., servers, VIs, or other metric collecting agents of the cloud), can itself inspect components of the cloud to extract or obtain the metrics, or can obtain the metrics by a combination of these. The QoS manager can receive, or otherwise obtain the metrics, periodically or, alternatively, continuously.

The QoS metrics can be, for example, associated with a particular consumer and/or consumer device, a server, a particular VI, computing resources (within a server, or within the cloud) used by a particular VI, or a plurality or combinations of any of these. It will be apparent to one of ordinary skill in the art that QoS metrics, and/or QoS objectives, associated with a particular consumer can be, or can correspond to, respective QoS metrics, and/or QoS objectives, associated with consumer devices that operate as, or are used by, the consumer to access cloud services. Accordingly, references to QoS metrics, and/or QoS objectives, associated with a consumer device further implies respective QoS metrics and/or QoS objectives associated with a consumer operating as, or using, the consumer device, whether the consumer device QoS metrics and/or QoS objective, are the same as, or derived from, the respective QoS metrics and/or QoS objectives associated with the consumer.

The QoS manager, at 602, can monitor QoS metrics to determine if one or more VIs are meeting QoS objectives associated with particular consumer devices or, alternatively, to determine if one or more VIs are exceeding QoS objectives associated with particular consumer devices. QoS metrics monitored at 602 can include QoS settings associated with the VI and/or particular indications of the degree to which the VI is able to meet (or, alternatively, exceed) the VI QoS objectives associated with a particular consumer device.

Indications that a VI is meeting, or exceeding, QoS objectives can include performance indicators (e.g., network latency, bandwidth, and/or throughput) associated with, for example, virtual devices used by the VI(s) to provide network services to the consumer device. In one example, QoS metrics received and monitored at 602 can include performance indicators associated with a VNIC in use by a VI to provide cloud services to a consumer device, and/or network components underlying the VNIC, such as a VSWITCH, a VNIC and/or device driver in an I/O server, a non-virtualizing adapter, and/or a physical adapter port of the non-virtualizing adapter. In an alternative case, QoS metrics received and monitored at 602 can include performance indicators associated with a VEA in use by a VI, using a self-virtualizing adapter and/or a VPORT, and/or physical port, of the self-virtualizing adapter underlying the VEA, to provide cloud services to a consumer device. QoS metrics received at 602 can also include performance indicators associated with the VI itself, such as for example, instantaneous or aggregate processor utilization and/or network throughput of the VI.

At 604 the QoS manager determines if the QoS metrics received at 602 indicate that the VI(s) are meeting the VI QoS objectives (e.g., greater than or equal to the objectives) associated with a particular consumer device using the VI(s). For example, a VI can be using one or more VNICs to perform network operations and the VI and/or VNICs can be experiencing conditions (e.g., increased VI workload and/or increased utilization of underlying network components and/or resources) under which the VI can no longer meet the VI QoS objectives using the VNIC(s). If the server includes a self-virtualizing adapter with an available VPORT, potentially the VI can, as an alternative to one or more of the VNICs, use one or more VEAs to meet the VI QoS objectives.

Accordingly, if at 604, the QoS manager determines that the VI is not meeting the VI QoS objectives, at 606 the QoS manager determines if the VI is using one or more VNICs, corresponding to one or more non-virtualizing adapters, to provide cloud services to the consumer device. If so, at 608 the QoS manager selects a VNIC among these. The QoS manager can select a VNIC based on, for example, performance indicators included in the QoS metrics that indicate that VNIC is experiencing conditions that reduce its ability to provide required network performance to the VI. Alternatively, the QoS manager can select a VNIC, or any one VNIC among several configured in the VI, based solely, for example, on that VNIC having an underlying lower-performing, non-virtualizing adapter.

At 610, the QoS manager determines if the server has a self-virtualizing network adapter, and whether that self-virtualizing network adapter then has a VPORT available, or that can be created (or, instantiated) to substitute for the selected VNIC. If so, at 612 the QoS manager determines if the VI using the available VPORT can meet the VI QoS objectives. For example, the QoS manager can evaluate VPORT capabilities such as maximum bandwidth or throughput, and/or minimum latency, in comparison to capabilities required to meet the VI QoS objectives.

If, at 612, the QoS manager determines that the available VPORT can meet the VI QoS objectives, at 614 the QoS manager acts to swap the available VPORT for the selected VNIC, to continue to provide cloud services to the consumer device. The QoS manager can, for example, act to swap the VPORT for the VNIC using, or communicating with, components of the server, such as a hypervisor (e.g., hypervisor 520 in FIG. 5) to perform the swapping. In some embodiments, the QoS manager can be, or can include, a component of a server (e.g., partially or wholly a function of a hypervisor) hosting the VIs, which can potentially perform the swapping.

Swapping the available VPORT and the selected VNIC can comprise configuring the VI to use the VPORT in place of the VNIC to provide cloud services to the consumer device. Configuring the VI to use the VPORT in place of the VNIC can include, for example, de-activating and/or de-configuring the selected VNIC from the VI and configuring and/or activating a VEA using the available VPORT as a virtual device within the VI. Swapping the VPORT and VNIC can include creating a VEA within the VI prior to configuring or activating the VEA, and/or deleting the VNIC from the VI, subsequent to de-activating and/or de-configuring the VNIC in the VI. Swapping the VPORT and VNIC can further include, for example, reassigning the VNIC IP address to the VEA associated with the VPORT.

Subsequent to swapping the VPORT and VNIC at 614, or if the QoS manager determines, at 610, that there is not a self-virtualizing VPORT available to swap for the selected VNIC, or determines, at 612, that the available VPORT cannot meet the VI QoS objectives, the QoS manger resumes QoS monitoring at 602. If, in resuming monitoring at 602, requirements to meet the VI QoS objectives in support of a particular consumer device no longer require such monitoring, the QoS manger can, optionally, discontinue monitoring. If, at 604 of method 600, the QoS manager determines that the virtual device (e.g., a VEA or VNIC) in use by VI is meeting or exceeding the VI QoS objectives, then at 616 the QoS manager can perform method 630 illustrated in FIG. 7.

Referring now to FIG. 7, at 632 of method 630, the QoS manager continues, from 616 of method 600, processing QoS metrics received at 602 of method 600. At 634 the QoS manager determines if the QoS metrics from 602 of method 600 are surpassing (i.e., exceeding) the VI QoS objectives. For example, a VI can be using one or more VEAs to perform network operations and the VI and/or the VEAs can be experiencing conditions (e.g., reduced VI workload and/or utilization of underlying network components and/or resources) under which the VI is surpassing the VI QoS objectives using those VEAs. If the server includes a non-virtualizing adapter and virtualization functions (e.g., those associated with a VNIC), potentially the VI can, as an alternative to one or more of the VEAs, use one or more VNICs to meet the VI QoS objectives.

Accordingly, if the QoS manager determines, at 634, that the VI is surpassing the VI QoS objectives, at 636 the QoS manager determines if the VI is using one or more VEAs, corresponding to one or more self-virtualizing adapters, to provide cloud services to the consumer device. If so, at 638 the QoS manager selects a VEA from the VEAs in use by the VI. The QoS manager can select a VEA based on, for example, performance indicators, included in the QoS metrics, associated with the ability of the VEA to provide required network performance to the VI. Alternatively, the QoS manager can select a VEA, or any one VEA among several configured in the VI, based solely, for example, on that virtual device being a VEA having an underlying higher-performing, self-virtualizing adapter.

At 640, the QoS manager determines if the server includes a non-virtualizing adapter, and/or VNIC virtualization functions (e.g., a VSWITCH and/or an I/O server with a VNIC or other virtualization intermediary, such as a VEA), that can provide a VNIC to substitute for the selected VEA. If so, at 642 the QoS manager determines if the VI can meet the VI QoS objectives using the VNIC (and/or, the non-virtualizing adapter). If so, at 644 the QoS manager acts to swap the VNIC for the selected VEA. The QoS manager can, for example, act to swap the VNIC for the VEA using, or communicating with, components of the server, such as a hypervisor (e.g., hypervisor 520 in FIG. 5) to perform the swapping. In some embodiments, the QoS manager can be, or can include, a component of a server (e.g., partially or wholly a function of a hypervisor) hosting the VIs, which can potentially perform the swapping.

Swapping the VEA and VNIC can comprise configuring the VI to use the VNIC in place of the VEA to provide cloud services to the consumer device. Configuring the VI to use the VNIC in place of the VEA can include, for example, de-activating and/or de-configuring the selected VEA from the VI and configuring and/or activating a VNIC within the VI using the available non-virtualizing adapter. Swapping the VEA and VNIC can include creating a VNIC within the VI prior to configuring or activating the VNIC, and/or deleting the VEA from the VI, subsequent to de-activating and/or de-configuring the VEA in the VI. Swapping the VEA and VNIC can further include reassigning the VEA IP address to the VNIC associated with the non-virtualizing network adapter.

Subsequent to swapping the VEA and VNIC at 644, or if the QoS manager determines: at 634 that the QOS metrics are meeting the VI QoS objectives, at 636 that the VI is not using VEAs, at 640 that there is not a non-virtualizing adapter available (or, alternatively, that the server does not provide VNIC virtualization functions), or, at 642, that a VNIC cannot meet the VI QoS objectives, at 646 the QoS manger resumes QoS monitoring, at 602 of method 600. If, in resuming monitoring at 602 of method 600, requirements to meet the VI QoS objectives in support of a particular consumer device no longer require such monitoring, the QoS manager can, optionally, discontinue monitoring.

While method 630 is described as ensuing from 616 of method 600, it will be understood by one of ordinary skill in the art that embodiments can, alternatively, implement method 630 to include an operation to receive and monitor QoS metrics, similar to operation 602 of method 600, and can, accordingly, perform method 630 independently of method 600. Similarly, it will be understood by one of ordinary skill in the art that embodiments can, alternatively, omit performing method 630 and can perform method 600 independently of method 600.

Embodiments can repeat method 600 for FIG. 6, and/or method 630 of FIG. 7, as operating conditions (e.g., utilization, bandwidth, throughput, and/or latency) of cloud computing resources (e.g., servers and/or component 110 adapters, VIs, and/or networks) change dynamically. For example, embodiments can perform the methods to swap a first pair of virtual devices (e.g., a VNIC and a VEA) and repeat the methods for additional virtual devices in use by a particular VI or, alternatively, for a plurality of VI.

While examples of the disclosure, such as system 500 of FIG. 5, and example methods 600 and 630 of FIGS. 6 and 7, are described in the context of a cloud computing environment, such as cloud 300 of FIG. 3, this is not intended to limitations. On the contrary, it would be apparent to one of ordinary skill in the art that the examples of the disclosure can be modified as necessary to be embodied in a computing system not included in a cloud computing environment, or to be employed in various virtualizing computing systems having virtual devices with differing types of underlying physical devices.

The present invention can be embodied as a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices—such as servers 61-64 of FIG. 2, servers 302 of FIG. 3, server 400 of FIG. 4, and/or server 510 of FIG. 5—from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions can be stored in a memory, such as instructions 442 of memory 440 in FIG. 4, and results of executing the computer readable program instructions can be stored in in a memory, such as instruction output 444 of memory 440 in FIG. 4. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing cloud computing resources,
   wherein each non-virtualizing computing device and each self-virtualizing computing device comprises a network device, the method comprising:
   receiving, by a processor of a QoS manager, via an interface communicatively coupled to the processor, first Quality of Service (QoS) metrics associated with a virtualization instance (VI) of a cloud computing environment, the first QoS metrics including performance indicators associated with at least one VI, a first virtual device, and a component among the components underlying the first virtual device, wherein the performance indicators comprise bandwidth, throughput, and latency associated with at least one of the first virtual device and the component among the components underlying the first virtual device, wherein the VI provides cloud computing services to a consumer device accessing the cloud computing environment, wherein the VI is associated with VI QoS objectives corresponding to the VI providing the cloud computing services to the consumer device, and wherein the VI is configured to use the first virtual device to meet the VI QoS objectives, the VI QoS objectives comprising QoS requirements and consumer criteria;
   determining, by the processor of the QoS manager, in response to receiving the first QoS metrics, and based at least in part on a first comparison of the first QoS metrics with the VI QoS objectives, that the VI is unable to meet the VI QoS objectives using the first virtual device, wherein the determination that the VI is unable to meet the VI QoS objectives using the first virtual device is based, at least in part, on the performance indicators;
   determining, by the processor of the QoS manager, based on the determining that the VI is unable to meet the VI QoS objectives using the first virtual device, that the first virtual device comprises a virtual form of a non-virtualizing computing device, that a first substitute virtual device, comprising a virtual form of a self-virtualizing computing device, the self-virtualizing device conforming to Single-Root I/O Virtualization design standards, is available to substitute for the first virtual device, and that the VI is able to meet the VI QoS objectives using the first substitute virtual device;
   configuring, dynamically by the processor of the QoS manager, based at least in part on the VI able to meet the VI QoS objectives using the first substitute virtual device, the VI to use the first substitute virtual device in place of the first virtual device;
   receiving, by the processor of the QoS manager, via the interface, second QoS metrics associated with the VI, wherein the second QoS metrics include performance indicators associated with at least one of the VI, a second virtual device, and a component among the components underlying the second virtual device, wherein the performance indicators comprise bandwidth, throughput, and latency associated with at least one of the second virtual device and the component included in the components underlying the second virtual device, wherein the VI is configured to use the second virtual device to meet the VI QoS objectives, the VI QoS objectives comprising QoS requirements and consumer criteria;
   determining, by the processor of the QoS manager, in response to receiving the second QoS metrics, and based on a second comparison of the second QoS metrics with the VI QoS objectives, that the VI is able to surpass the VI QoS objectives using the second virtual device, wherein the determination that the VI is able to surpass the VI QoS objectives using the second virtual device is based, at least in part, on the performance indicators; determining, by the processor of the QoS manager, based on the determining that the VI is able to surpass the VI QoS objectives using the second virtual device, that the second virtual device comprises a virtual form of the self-virtualizing computing device, the self-virtualizing device conforming to Single-Root I/O Virtualization design standards, that a second substitute virtual device, comprising a virtual form of the non-virtualizing computing device, is available to substitute for the second virtual device, and that the VI is able to meet the VI QoS objectives using the second substitute virtual device; and
   configuring, dynamically by the processor of the QoS manager, based at least in part on the VI able to meet the VI QoS objectives using the second substitute virtual device, the VI to use the second substitute virtual device in place of the second virtual device.

* * * * *